United States Patent [19]

Mikami

[11] Patent Number: 5,220,427
[45] Date of Patent: Jun. 15, 1993

[54] MAGNETIC REPRODUCING APPARATUS HAVING CIRCUIT FOR PREVENTING REVERSAL OF WHITE PEAK

[75] Inventor: Seiichi Mikami, Yokohama, Japan

[73] Assignee: Victor Company of Japan, Ltd., Yokohama, Japan

[21] Appl. No.: 422,884

[22] Filed: Oct. 19, 1989

[30] Foreign Application Priority Data

Oct. 20, 1988 [JP] Japan ............... 63-265180

[51] Int. Cl.$^5$ ............................................. H04N 5/52
[52] U.S. Cl. ................. 358/174; 455/234.1; 360/65
[58] Field of Search ............ 360/37.1, 33.1, 38.1, 360/30, 65; 358/330, 328, 310, 340, 327, 315, 39, 35, 174, 175; 455/234.1, 242.1

[56] References Cited

U.S. PATENT DOCUMENTS

| | | | |
|---|---|---|---|
| 4,064,537 | 12/1977 | Ota et al. | 358/127 |
| 4,110,798 | 8/1978 | Miller et al. | 360/65 |
| 4,170,023 | 10/1979 | Yamakoshi et al. | 455/234.1 X |
| 4,303,952 | 12/1981 | Yamamitsu et al. | 360/65 |
| 4,363,053 | 12/1982 | Kanamoto et al. | 360/67 |
| 4,470,080 | 9/1984 | Kimura | 360/30 |
| 4,510,536 | 4/1985 | Tabata et al. | 360/65 |
| 4,682,251 | 7/1987 | Hirota et al. | 360/33.1 |
| 4,730,165 | 3/1988 | Nishino et al. | 328/142 |
| 4,819,098 | 4/1989 | Ryan | 360/37.1 |
| 4,821,087 | 4/1989 | Horjo | 358/174 X |
| 5,020,147 | 5/1991 | Okanobu | 455/234.1 X |

FOREIGN PATENT DOCUMENTS

0015499 9/1980 European Pat. Off. .

Primary Examiner—Andrew L. Sniezek
Attorney, Agent, or Firm—Jacobson, Price, Holman & Stern

[57] ABSTRACT

A magnetic reproducing apparatus wherein reversal of white peak is reduced in the luminance signal reproducing system. This magnetic reproducing apparatus includes a negative feedback circuit for applying a negative feedback to an input FM signal obtained by reproducing a magnetic recording, and a demodulation circuit responsive to an FM signal outputted from the negative feedback circuit to demodulate it, thus to provide a reproduced luminance signal. The negative feedback circuit includes an amplifier circuit having a non-inverting input terminal to which FM signal or a signal corresponding thereto is delivered, a first limiter circuit for applying amplitude limiting to the output signal from the amplifier circuit, and a delay circuit for delivering, to the amplifier circuit, a delay signal which lags the amplitude limited signal from the first limiter circuit by a phase angle of 90 degrees in the carrier frequency band of the FM signal.

6 Claims, 7 Drawing Sheets

PRIOR ART

FIG. 9D  LIMITER LINE

FIG. 10D  LIMITER LINE

LIMITER LINE

MAGNETIC REPRODUCING APPARATUS HAVING CIRCUIT FOR PREVENTING REVERSAL OF WHITE PEAK

BACKGROUND OF THE INVENTION

This invention relates to a magnetic reproducing apparatus provided with a limiter circuit for obtaining a reproduced luminace signal used in a magnetic reproducing apparatus such as a video tape recorder (VTR), etc.

In VTRs for consumer use generally and widely used at present, at the time of recording, a luminance signal (Y signal) is frequency-modulated, resulting in a FM luminance signal. At this time, a carrier chrominance signal (C signal) is subjected to frequency conversion so that it has a frequency lower than that of the FM luminance signal resulting in a low frequency carrier chrominance signal. At the time of reproducing a magnetic tape on which a multiplexed signal obtained by applying frequency-division multiplexing to these FM luminance signal and low frequency carrier chrominance signal is recorded, an approach is employed to separate the FM luminance signal and the low frequency carrier chrominance signal from the multiplexed signal to demodulate the FM luminance signal to obtain the original Y signal, and to apply frequency conversion to the low frequency carrier chrominance signal so that it has a frequency equal to the original frequency to obtain the original C signal.

For separating an FM luminance signal from the multiplexed signal recorded on the magnetic tape to reproduce an original Y signal, the following technique is employed.

Namely, the multiplexed signal reproduced alternately, e.g., by two video heads scanning on a magnetic tape is amplified at the reproducing preamplifier circuits of the two systems, and is then delivered to a high-pass filter circuit through a switch for switching two outputs from the preamplifier circuits. At this filter circuit, the low frequency carrier chrominance signal is separated and removed. The FM luminance signal thus obtained is delivered to a drop-out compensation circuit, at which compensation of drop-out is made. Then, this signal is applied to the limiter circuit, at which level change is removed. Then, the signal thus obtained is delivered to the FM demodulation circuit and is demodulated thereat. Thus, the Y signal which has been subjected to video emphasis can be obtained.

Reversal from white peak to black (hereinafter referred to as reversal of white peak) is known as a phenomenon to impede or obstruct an improvement in the reproduced picture quality. For a limiter circuit for preventing occurrence of such an unfavorable phenomenon, a double limiter circuit is used. This double limiter circuit serves to apply double-limiting operation to a drop-out compensated FM luminance signal delivered thereto to prevent an inverted white peak to sufficiently effect a video emphasis, thus to improve S/N ratio of the FM luminance signal before demodulation.

Figure 1:
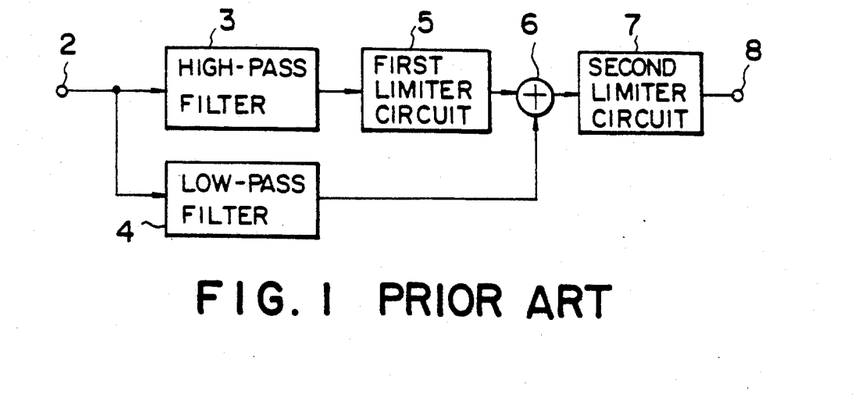
FIG. 1 is a block diagram showing a double limiter circuit used in a conventional magnetic reproducing apparatus.
Figure 2A:
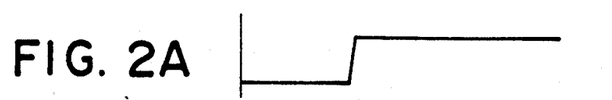
FIGS. 2A to 2J are waveform diagrams of respective constituent parts of the double limiter circuit shown in FIG. 1.
Figure 2B:
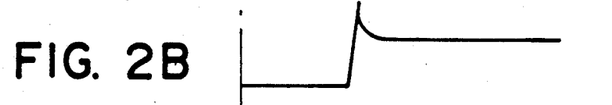
Figure 2C:
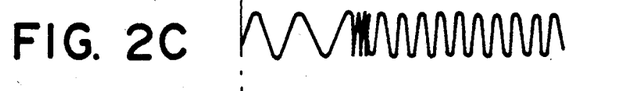
Figure 2D:
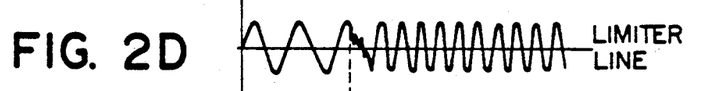
Figure 2E:
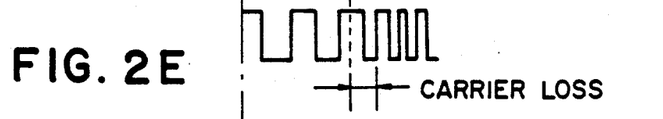
Figure 2F:
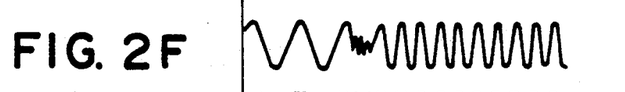
Figure 2G:
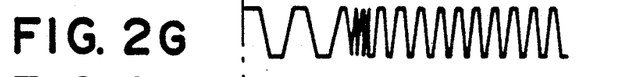
Figures 2H, 2I:
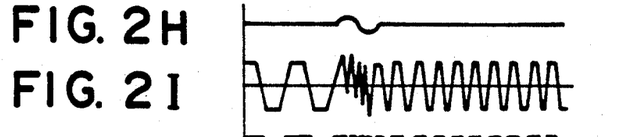
Figure 2J:
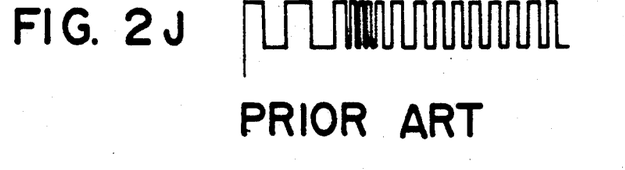

FIG. 1 is a block diagram of the double limiter circuit used for a conventional magnetic reproducing apparatus. FIGS. 2A to 2C show signal waveforms in a recording system, FIG. 2A is of a luminance signal to be recorded, FIG. 2B is of the luminance signal subjected to video pre-emphasis and FIG. 2C is of the FM luminance signal to be recorded. FIGS. 2D and 2F through 2J show signal waveforms of respective constituent portions of the double limiter circuit shown in FIG. 1. And FIG. 2E shows a waveform of a signal obtained by passing a reproduced FM luminance signal through a sole limiter circuit in which carrier waves at the white peak are lost result in serious reversal of white peak.

The double limiter circuit 1 used for a conventional magnetic reproducing apparatus comprises, as shown in FIG. 1, an input terminal 2 to which an FM luminance signal (signal shown in FIG. 2D) from a drop-out compensation circuit (not shown) is applied, a high-pass filter circuit 3 responsive to the FM luminance signal applied thereto through the input terminal 2 to output a signal (signal shown in FIG. 2F) corresponding to the medium and high frequency band of the FM luminance signal, in which the lower side-band component is eliminated from the FM luminance signal, a low-pass filter circuit 4 responsive to the FM luminance signal applied thereto through the input terminal 2 to derive, from the FM luminance signal, a signal having the lower side-band component (signal shown in FIG. 2H) to output it therefrom, a first limiter circuit 5 responsive to the output signal delivered thereto to output a signal (signal shown in FIG. 2G) obtained by allowing the amplitude of the signal to be made uniform and removing noises in the vicinity of the carrier of the signal, an adder circuit 6 for outputting an addition signal (signal shown in FIG. 2I) obtained by adding an output signal from the low-pass filter circuit 4 to an output signal from the first limiter circuit 5, a second limiter circuit 7 responsive to the addition signal from the adder circuit 6 to output an FM luminance signal (signal shown in FIG. 2J) obtained by allowing the amplitude of the addition signal to be made uniform, and an output terminal 8 for delivering, to an FM demodulation circuit (not shown), the FM luminance signal from the second limiter circuit 7.

As stated above, such a conventional reproducing apparatus including double limiter circuit 1 can reduce more effectively the influence of the inverted white peak as compared to other conventional apparatus.

While the double limiter circuit 1 used in the above-described magnetic reproducing apparatus can reduce more effectively the influence of the reversal of white peak as compared to other conventional apparatus, it has the following drawbacks. First, it is difficult to make a phase matching or adjustment between the output signal from the first limiter circuit 5 and the output signal from the low-pass filter circuit 4. Secondly, when the FM luminance signal applied to the input terminal 2 is completely separated and outputted by the high-pass filter circuit 3 and the low-pass filter circuit 4, a demodulated reproduced luminance signal obtained by delivering the FM luminance signal from the output terminal 8 to the FM demodulation circuit (not shown) has a frequency characteristic which is not flat continuously from the low frequency band to the high frequency band.

For this reason, a filter circuit having a steep attenuation characteristic cannot be used as the high-pass filter circuit 3 and the low-pass filter 4. As a result, a signal having a lower side-band component is partially outputted from the high-pass filter circuit 3, so a carrier loss is produced at the first limiter circuit 5 of the next stage, lacking in necessary zero cross point. Accordingly, reversal of white peak is produced, thus failing to completely eliminate the reversal of white peak.

SUMMARY OF THE INVENTION

Accordingly, an object of this invention is to provide a magnetic reproducing apparatus capable of obtaining an excellent reproduced signal in which reversal of white peak is reduced to much extent.

According to the present invention, there is provided a magnetic reproducing apparatus comprising a negative feedback circuit for applying a negative feedback to an input frequency modulated (FM) signal obtained by reproducing a magnetic recording, and a demodulation circuit responsive to an FM signal outputted from the negative feedback circuit to demodulate it, thus to provide a reproduced luminance signal, the negative feedback circuit comprising: an amplifier circuit having a non-inverting input terminal to which the FM signal or a signal corresponding to the FM signal is delivered; a first limiter circuit for applying an amplitude limiting to an output signal from the amplifier circuit; and a delay circuit for delivering, to an inverting input terminal of the amplifier circuit, a delay signal which lags the amplitude limited signal from the first limit circuit by a phase angle of 90 degrees in a carrier frequency band of the FM signal.

A magnetic reproducing apparatus according to this invention utilizes the following facts. (1) For the lower side-band component lower than the carrier frequency, according as the level of the input signal to the negative feedback circuit I becomes smaller, the level of the output signal becomes smaller accordingly. (2) In the frequency band higher than a carrier frequency which is the portion where reversal of white peak is likely to occur, an operation is performed such that according as the level of the input signal becomes smaller, the level of the output signal becomes larger. In addition, in the frequency band where the output signal from the preceding stage (high-pass filter circuit) of the limiter circuit has a large amplitude level, the frequency characteristic is the same as in the prior art, and the phase characteristic linearly varying is provided. Accordingly, there is no possibility that there occurs a great change in the frequency characteristic of a demodulated luminance signal, or unduration or discontinuity of the frequency characteristic thereof, etc., thus making it possible to reduce the reversal of white peak to a great extent.

DESCRIPTION OF THE PREFERRED EMBODIMENTS

Figure 3:
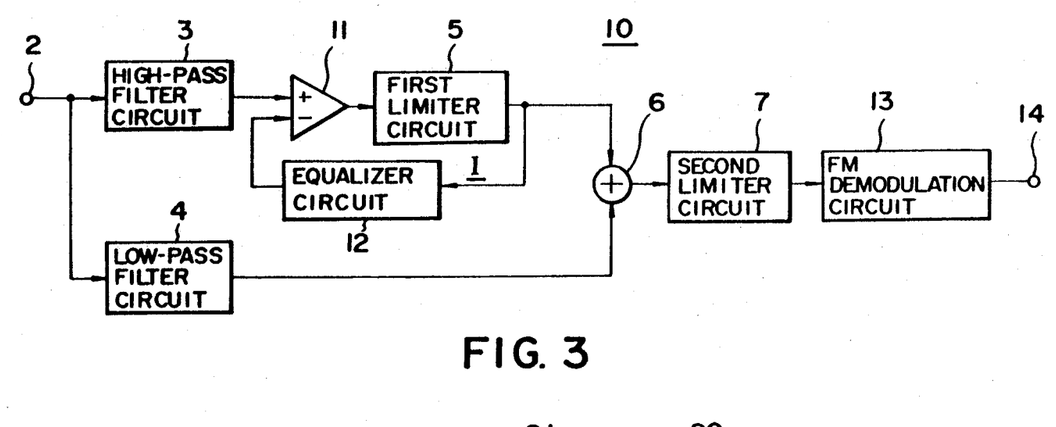
FIGS. 3 to 6 are block diagrams showing first to fourth embodiments of a limiter circuit used in a magnetic reproducing apparatus according to this invention, respectively.

FIG. 3 is a circuit diagram showing a first embodiment of a limiter circuit according to this invention.

The double limiter circuit 10 is characterized in that an amplifier circuit 11 and an equalizer circuit 12 are added to the arrangement of the above-described double limiter circuit 1 shown in FIG. 1 to thereby form a negative feedback circuit I (negative feedback circuit consisting of first limiter circuit 5, amplifier circuit 11, and equalizer circuit 12).

Generally reversal of white peak is likely to occur in the frequency band higher than the carrier frequency in which a modulating luminance signal undergoes an overshoot to the white side due to pre-emphasis in a recording system, and the level of the reproduced FM luminance signal is low. Accordingly, by an employment of this negative feedback circuit I reversal of white peak becomes hard to occur.

Namely, this double limiter circuit 10 contemplates allowing the signal level in the frequency band where reversal of white peak is likely to occur to be large to ensure necessary zero-cross points, and attenuating the lower side-band component to deliver, to the first limiter circuit 5, a signal by which reversal of white peak is difficult to occur.

In more detail, the double limiter circuit 10 comprises an input terminal 2 to which an FM luminance signal (signal shown in FIG. 9D) from a drop-out compensation circuit (not shown) is applied, a high-pass filter circuit 3 responsive to the FM luminance signal applied thereto through the input terminal 2 to output a signal (signal shown in FIG. 9E) corresponding to the medium and high frequency band of the FM luminance signal, in which the lower side-band component is eliminated from the FM luminance signal, a low-pass filter 4 responsive to the FM luminance signal applied thereto through the input terminal 2 to derive, from the FM luminance signal, a signal (signal shown in FIG. 9I) having the lower side-band component to output it therefrom, the amplifier circuit 11 operative to output a signal (signal shown in FIG. 9F) obtained by applying subtractive processing to the output signal from the high-pass filter circuit 3, which is delivered to the non-inverting input terminal thereof, and an output signal from the equalizer circuit 12 described later in detail, which is delivered to the inverting input terminal thereof. The double limiter circuit further comprises the first limiter circuit 5 responsive to the output signal from the amplifier circuit 11 delivered thereto to allow the amplitude of this signal to be made uniform to output a signal (signal shown in FIG. 9G) from which noises in the vicinity of the carrier of the signal are eliminated, the equalizer circuit 12 responsive to the output signal from the first limiter circuit 5 delivered thereto output a delay signal (signal shown in FIG. 9H) subjected to delay processing by a time T which retards the output signal (signal shown in FIG. 9E) from the high-pass filter circuit 3 by a phase angle of 90 degrees in the carrier frequency band, an adder circuit 6 operative to output an addition signal (signal shown in FIG. 9J) obtained by, to the output signal from the first limiter circuit 5, adding an output signal from the low-pass filter circuit 4, and a second limiter circuit 7 responsive to the addition signal from the adder circuit 6 delivered thereto to output an FM luminance signal (signal shown in FIG. 9K) obtained by allowing the amplitude of this signal to be made uniform.

The FM luminance signal from the second limiter circuit 7 is applied to an FM demodulation circuit 13. From this circuit, a demodulated reproduced luminance signal (signal shown in FIG. 9L) is outputted through an output terminal 14.

Figure 9A:
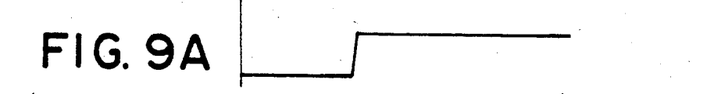
FIGS. 9A to 9L are waveform diagrams of respective constituent parts of the circuits shown in FIGS. 3 and 4.
Figures 9B, 9C:
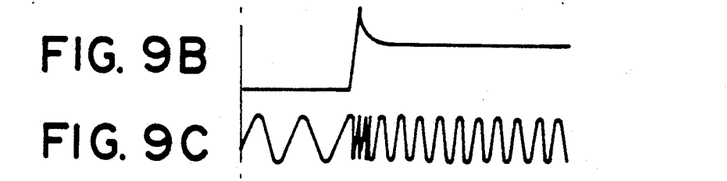

Incidentally, FIGS. 9A to 9C show signal waveforms of a luminance signal to be recorded, the luminance signal subjected to pre-emphasis and the FM luminance signal to be recorded, respectively, in a recording system.

The above-described negative feedback circuit I is operative by the action of the first limiter circuit 5 so that the feedback factor is small when a signal having a large amplitude is delivered from the high-pass filter circuit 3, and the feedback factor is large when a signal having a small amplitude is delivered. Further, by the action of the equalizer circuit 12 operative to output a delay signal which lags the output signal (signal shown in FIG. 9E) from the high-pass filter circuit 3 by a phase angle of 90 degrees in the carrier frequency band, the negative feedback circuit I is operative so that (1) according as the level of an input signal to the negative feedback circuit I becomes small, the level of the output signal becomes small in a frequency band lower than the carrier frequency, i.e., in the lower side component region, and (2) according as the level of an input signal becomes small, the level of its output signal becomes large in a frequency band higher than the carrier frequency where reversal of white peak is likely to occur.

Unlike the method of merely linearly changing the frequency characteristic of an output signal from the high-pass filter circuit 3, in the case of an ordinary large amplitude level, the phase characteristic also linearly changes while the frequency characteristic is the same as the conventional one. This results in no possibility that there occurs a great change in the frequency characteristic of a demodulated luminance signal, or unduration and/or discontinuity in the frequency characteristic.

Figure 7:
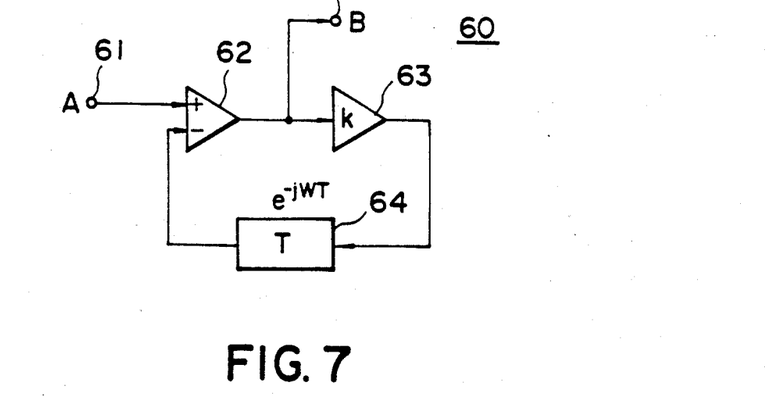
FIG. 7 is an equivalent circuit diagram of the negative feedback circuit which is the essential part of this invention.

An attempt will be made to analyze the circuit operation with reference to FIGS. 7 and 8 in order to clearly grasp the negative feedback characteristic of the above-mentioned negative feedback circuit I.

The equivalent circuit 60 of the negative feedback circuit is composed of an input terminal 61, amplifier circuits 62 and 63, a delay circuit 64, and an output terminal 65. In FIG. 7, A is an input signal, B is an output signal, K is a feedback factor, and T is a delay time.

In the equivalent circuit 60, the relation between the input signal A and the output signal B is expressed as follows:

$$B = A - KBe^{-jwT} \quad (1)$$

The amplification factor (gain) is expressed as follows:

$$|B/A| = i\sqrt{1 + 2K \cos wT + K^2} \quad (2)$$

Figure 8:
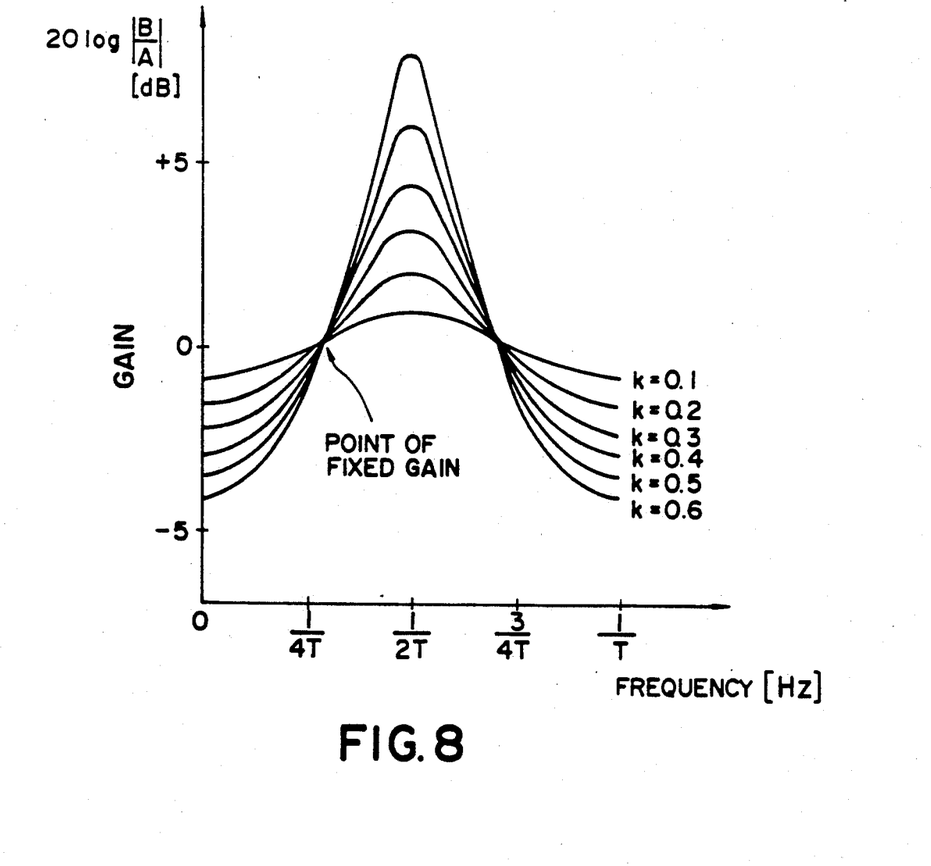
FIG. 8 is a graph showing the characteristic of input-/output signal change rate versus frequency using the feedback factor K of the equivalent circuit shown in FIG. 7 as a parameter.

FIG. 8 represents the amplification factor of the equivalent circuit 60 using the feedback factor K as a parameter. By changing the value of the feedback factor K, the non-linear operation in the first limiter circuit 5, i.e., the value of the amplification factor K when changing the level of an input signal is plotted.

If the relationship expressed as $2K \cos wT + K^2 = 0$ holds in the above equation (2), the gain of the equivalent circuit 60 becomes equal to 0 dB and is thus fixed.

Accordingly, the following relation is derived from the above relationship:

$$\cos wT = -K/2.$$

As shown in FIG. 8, in a range where the value of K is 0.1 to 0.5, the gain of the equivalent circuit is equal to 0 dB under the frequency condition of $f = 1/4T$, and is thus fixed.

Accordingly, in the above-mentioned negative feedback circuit I, by outputting (providing a negative feedback to the amplifier circuit 11), from the equalizer circuit 12, a signal (signal shown in FIG. 9H) subjected to delay processing by a time T so that it lags an output signal (signal shown in FIG. 9E) from the high-pass filter circuit 3 by a phase angle of 90 degrees in the carrier frequency band, it is possible to allow the gain in the carrier frequency band to be fixed. Furthermore, because the feedback factor K of the circuit 60 becomes larger and approaches to one as the level of the input signal thereto becomes smaller, the above-mentioned operating conditions (1) and (2) are satisfied.

Figure 4:
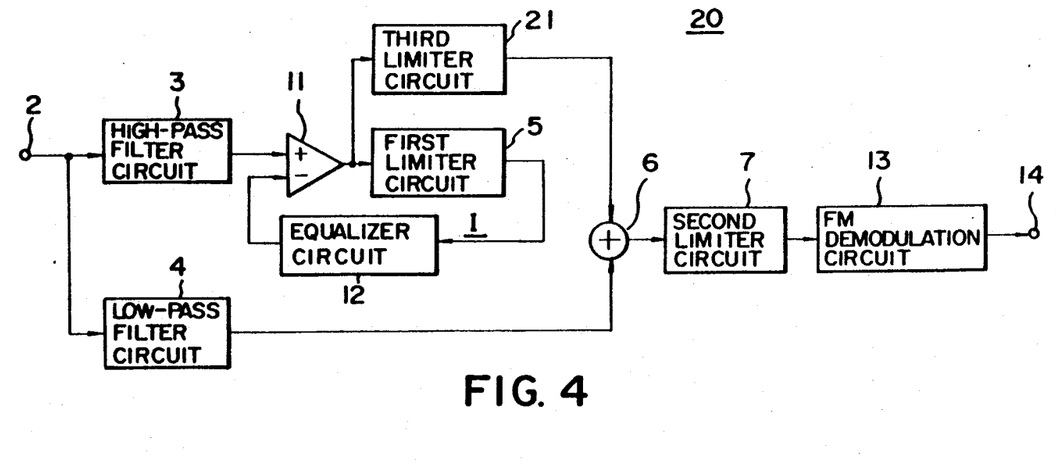

The double limiter circuit 20 shown in FIG. 4 is a modification of the above-described double limited circuit 10 shown in FIG. 3. The same components as those previously described are designated by the same reference numerals, respectively, and their explanation will be omitted.

The double limiter circuit 20 differs from the above-described double limiter circuit 10 shown in FIG. 3 in that the former circuit includes a first limiter circuit 5 constituting the negative feedback circuit I and a third limiter circuit 21 for basically carrying out the limiting processing.

Since this arrangement can set a non-linear frequency characteristic in the negative feedback circuit I irrespective of the third limiter circuit 21, there results the advantage that the degree of freedom in design is increased, which cannot be obtained with the double limiter circuit 10.

Figure 9D:
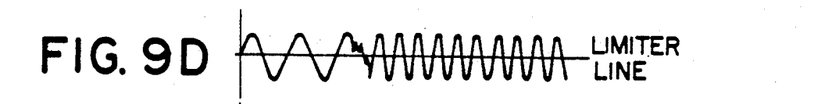
Figure 9E:
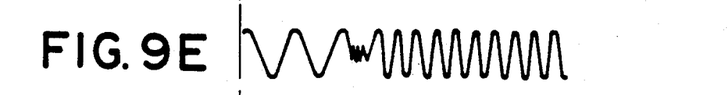
Figure 9F:
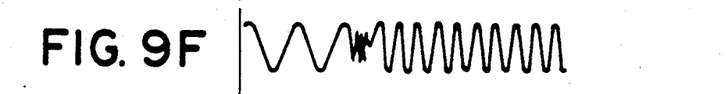
Figures 9G, 9H:
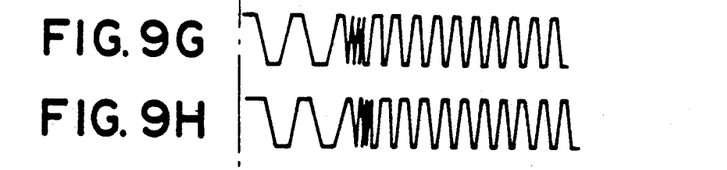
Figures 9I, 9J:
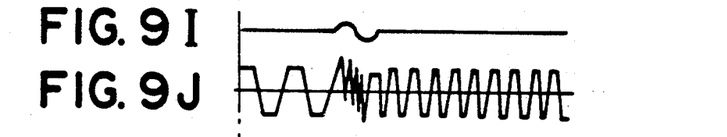
Figure 9K:
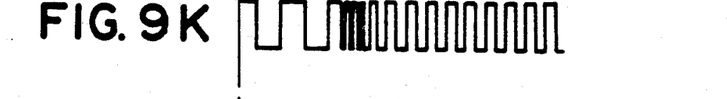
Figure 9L:
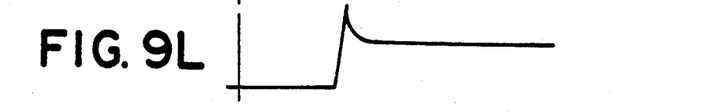

The double limiter circuit 20 is composed of an input terminal 2 to which a signal shown in FIG. 9D is applied, a high-pass filter circuit 3 for outputting a signal shown in FIG. 9E, a low-pass filter circuit 4 for outputting a signal shown in FIG. 9I, an amplifier circuit 11 for outputting a signal shown in FIG. 9F, a third limiter circuit 21 responsive to the output signal from the amplifier circuit 11 delivered thereto to output, to the adder circuit 6, a signal obtained by allowing the amplitude of the output signal to be made uniform, a first limiter circuit 5 for outputting a signal shown in FIG. 9G, an equalizer circuit 12 for outputting a signal shown in FIG. 9H, an adder circuit 6 for outputting a signal shown in FIG. 9J, and a second limiter circuit 7 for outputting a signal shown in FIG. 9K. The FM luminance signal from the second limiter circuit 7 is applied to an FM demodulation circuit 13. A reproduced luminance signal (signal shown in FIG. 9L) demodulated at the circuit 13 is outputted through an output terminal 14.

In implementing the double limiter circuit 20 of such a structure as an IC (integrated circuit), since there are many instances where adder circuit 6, second limiter circuit 7, FM demodulation circuit 13, and third limiter circuit 21 are already assembled into one chip IC, this is easily put into practice.

Figure 5:
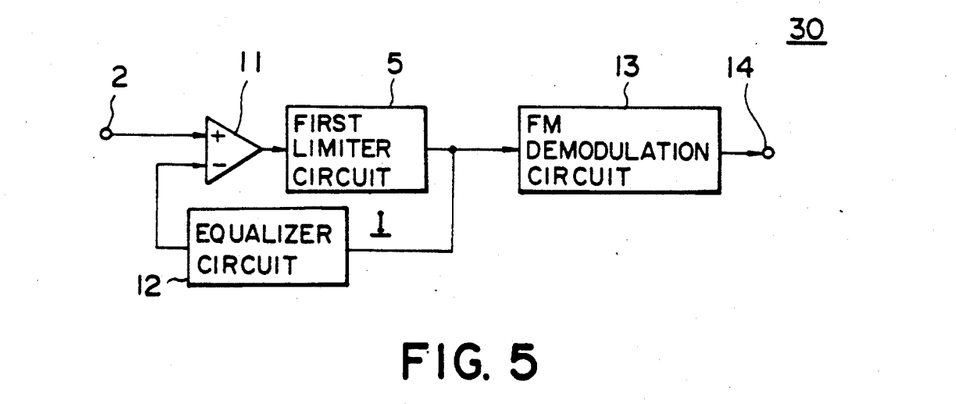
Figure 6:
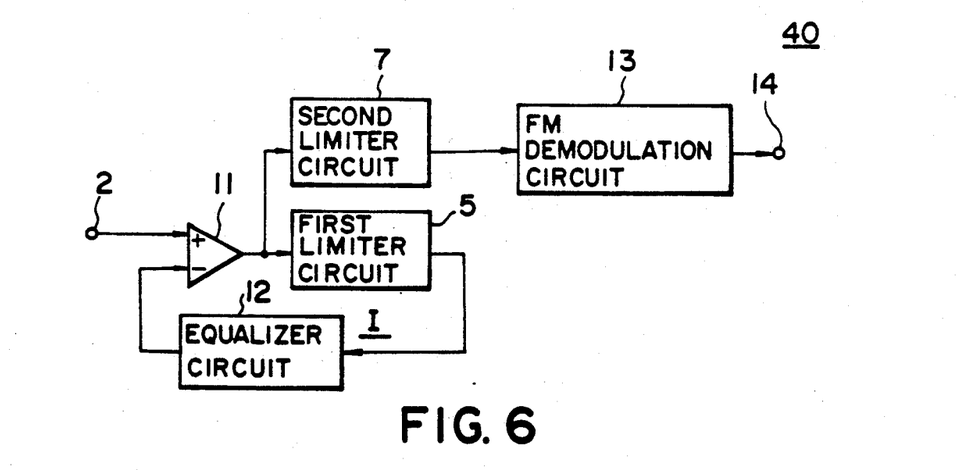

Referring to FIGS. 5 and 6, there are shown embodiments applied to a VTR having a demodulation circuit system which does not constitute the double limiter circuit. The same components as those previously described are designated by the same reference numerals, respectively, and their explanation will be omitted.

Figures 10A, 10B:
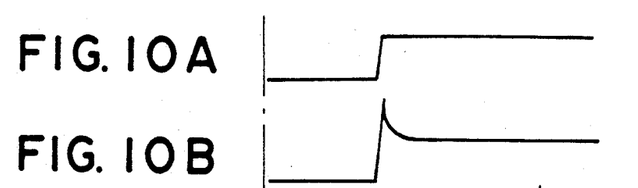
FIGS. 10A to 10H are waveform diagrams of respective constituent parts of the circuit shown in FIG. 5, and FIGS. 11A to 11I are waveform diagrams of respective constituent parts of the circuit shown in FIG. 6.
Figure 10C:
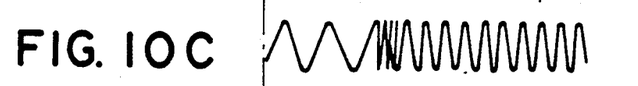
Figure 10D:
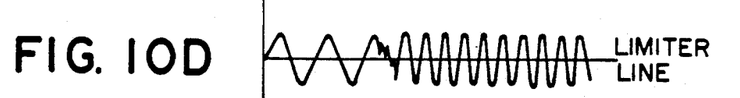
Figure 10E:
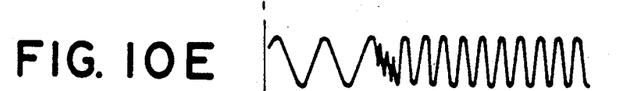
Figure 10F:
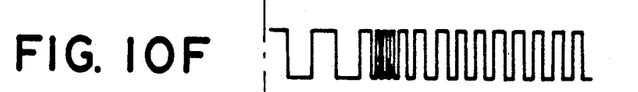
Figure 10G:
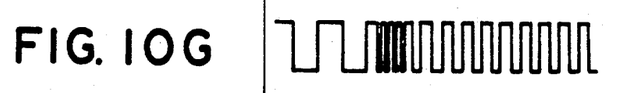
Figure 10H:
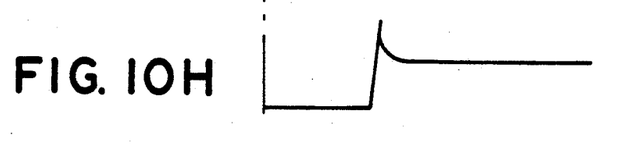

In FIG. 5, the limiter circuit 30 is composed of the above-described negative feedback circuit I. This limiter circuit 30 is composed of an input terminal 2 to which an FM luminance signal shown in FIG. 10D is applied, an amplifier circuit 11 for outputting a signal shown in FIG. 10E, a first limiter circuit 5 responsive to the output signal from the amplifier circuit 11 delivered thereto to output a signal shown in FIG. 10F, and an equalizer circuit 12 for outputting a signal shown in FIG. 10G. The FM luminance signal from the first limiter circuit 5 is applied to an FM demodulation circuit 13. A reproduced luminance signal (signal shown in FIG. 10H) demodulated at the circuit 13 is outputted through an output terminal 14.

Figure 11A:
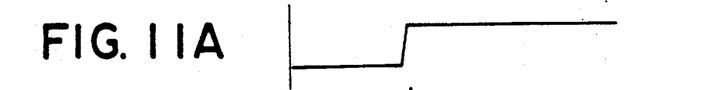
Figure 11B:
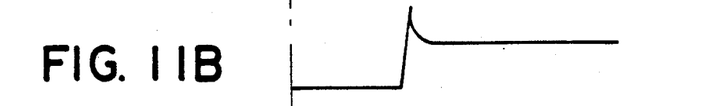
Figure 11C:
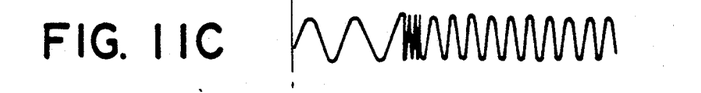
Figure 11D:
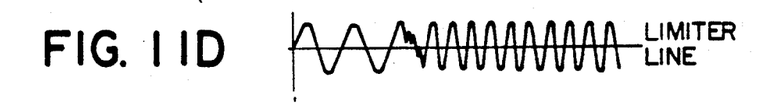
Figure 11E:
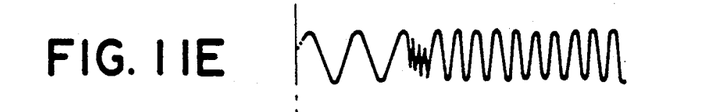
Figure 11F:
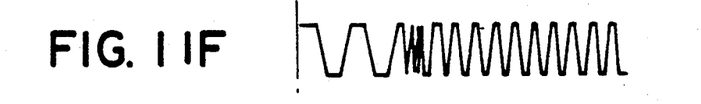
Figure 11G:
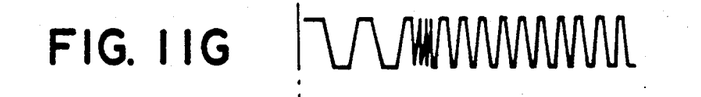
Figure 11H:
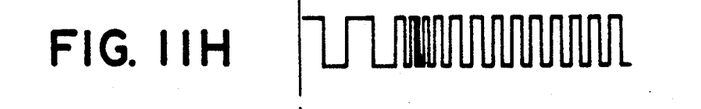
Figure 11I:
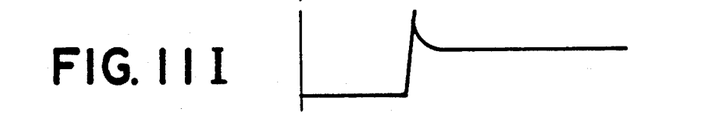

Further, in FIG. 6, the limiter circuit 40 is composed of the above-described negative feedback circuit I and the second limiter circuit 7. This limiter circuit 40 is composed of an input terminal 2 to which an FM luminance signal shown in FIG. 11D is applied, an amplifier circuit 11 for outputting a signal shown in FIG. 11E, a first limiter circuit 5 responsive to the output signal from the amplifier circuit 11 delivered thereto to output a signal shown in FIG. 11F, a second limiter circuit 7 responsive to the output signal from the amplifier circuit 11 delivered thereto to output a signal shown in FIG. 11H, and an equalizer circuit 12 for outputting a signal shown in FIG. 11G. The FM luminance signal from the second limiter circuit 7 is applied to an FM demodulation circuit 13. Thus, a reproduced luminance signal demodulated at the circuit 13 (signal shown in FIG. 11I) is outputted through an output terminal 14.

What is claimed is:

1. A feedback circuit, having a feedback factor for controlling a level of an incoming frequency modulated (FM) signal having a predetermined carrier frequency band, comprising:
   a differential amplifier, having a non-inverting input terminal to which the incoming FM signal or a signal corresponding to the FM signal is delivered and an inverting input terminal to which a subtraction signal for a subtractive processing is delivered, to output a difference signal having a level corresponding to a difference between the incoming FM signal and the subtraction signal;
   a first limiter for making the level of the difference signal uniform, thus outputting a level-uniform output signal; and
   delay means for delaying the output signal by a phase angle of 90 degrees in the carrier frequency band, thus outputting a delay signal which is delivered to the inverting input terminal of the amplifier, as the subtraction signal,
   wherein the feedback factor is in inverse proportional to the level of the incoming FM signal.

2. A circuit according to claim 1, further comprising a second limiter for making the level of the difference signal uniform, thus outputting another level-uniform output signal.

3. A circuit of preventing reversal of white peak in a video signal, having a carrier frequency, including a frequency modulated (FM) luminance signal having a frequency band comprising a carrier frequency band component with respect to the carrier frequency and lower and higher side-band components to the carrier frequency band component, comprising:
   a high-pass filter, responsive to the FM luminance signal, for eliminating the lower side-band component and outputting a first signal having a frequency band corresponding to the higher side-band component;
   a low-pass filter, responsive to the FM luminance signal, for outputting a second signal having a frequency band corresponding to the lower side-band component;
   a differential amplifier, having a non-inverting input terminal to which the first signal is delivered and an inverting input terminal to which a subtraction signal for a subtractive processing is delivered, to output a difference signal having a level corresponding to a difference between the first and subtraction signals;
   a first limiter for making the level of the difference signal uniform, thus outputting a level-uniform output signal; and
   delay means for delaying the level-uniform output signal by a phase angle of 90 degrees in the carrier frequency band, thus outputting a delay signal which is delivered to the inverting input terminal of the amplifier, as the subtraction signal;
   an adder for adding level-uniform output signal and the second signal to output an addition signal;
   a second limiter for making a level of the addition signal uniform, thus outputting a level-uniform addition signal; and
   a FM demodulator for demodulating the level-uniform addition signal, thus outputting a demodulated reproduced luminance signal,
   wherein the amplifier, first limiter and delay means constitute a feedback circuit having a feedback factor which is in inverse proportional to a level of the first signal, thus the smaller a level of the FM luminance signal, the smaller a level of the demodulated reproduced luminance signal in the lower side-band component, whereas the smaller the level of the FM luminance signal, the larger the level of the demodulated reproduced signal in the higher side-band component.

4. A circuit of preventing reversal of white peak in a video signal, having a carrier frequency, including a frequency modulated (FM) luminance signal having a frequency band comprising a carrier frequency band component with respect to the carrier frequency and lower and higher side-band components to the carrier frequency band component, comprising:
   a high-pass filter, responsive to the FM luminance signal, for eliminating the lower side-band component and outputting a first signal having a frequency band corresponding to the higher side-band component;
   a low-pass filter, responsive to the FM luminance signal, for outputting a second signal having a frequency band corresponding to the lower side-band component;
   a differential amplifier, having a non-inverting input terminal to which the first signal is delivered and an inverting input terminal to which a subtraction signal for a subtractive processing is delivered, to output a difference signal having a level corresponding to a difference between the first and subtraction signals;

a first limiter for making the level of the difference signal uniform, thus outputting a first level-uniform output signal;

delay means for delaying the first level-uniform output signal by a phase angle of 90 degrees in the carrier frequency band, thus outputting a delay signal which is delivered to the inverting input terminal of the amplifier, as the subtraction signal;

a second limiter for making the level of the difference signal uniform, thus outputting a second level-uniform output signal;

an adder for adding the second level-uniform output signal and second signal to output an addition signal;

a third limiter for making a level of the addition signal uniform, thus outputting a level-uniform addition signal; and a FM demodulator for demodulating the level-uniform addition signal, thus outputting a demodulated reproduced luminance signal, wherein the amplifier, first limiter and delay means constitute a feedback circuit having a feedback factor which is in inverse proportional to a level of the first signal, thus the smaller a level of the FM luminance signal, the smaller a level of the demodulated reproduced luminance signal in the lower side-band component, whereas the smaller the level of the FM luminance signal, the larger the level of the demodulated reproduced signal in the higher side-band component.

5. A circuit of preventing reversal of white peak in a video signal, having a carrier frequency, including a frequency modulated (FM) luminance signal having a carrier frequency band with respect to the carrier frequency, comprising:

a differential amplifier, having a non-inverting input terminal to which the FM luminance signal or a signal corresponding to the FM luminance signal is delivered and an inverting input terminal to which a subtraction signal for a subtractive processing is delivered, to output a difference signal having a level corresponding to a difference between the FM luminance signal and subtraction signal;

a limiter for making the level of the difference signal uniform, thus outputting a level-uniform output signal;

delay means for delaying the level-uniform output signal by a phase angle of 90 degrees in the carrier frequency band, thus outputting a delay signal which is delivered to the inverting input terminal of the amplifier, as the subtraction signal; and a FM demodulator for demodulating the level-uniform addition signal, thus outputting a demodulated reproduced luminance signal.

6. A circuit of preventing reversal of white peak in a video signal, having a carrier frequency, including a frequency modulated (FM) luminance signal having a carrier frequency band with respect to the carrier frequency, comprising:

a differential amplifier, having a non-inverting input terminal to which the FM luminance signal or a signal corresponding to the FM luminance signal is delivered and an inverting input terminal to which a subtraction signal for a subtractive processing is delivered, to output a difference signal having a level corresponding to a difference between the FM luminance signal and subtraction signal;

a first limiter for making the level of the difference signal uniform, thus outputting a first level-uniform output signal;

delay means for delaying the first level-uniform output signal by a phase angle of 90 degrees in the carrier frequency band, thus outputting a delay signal which is delivered to the inverting input terminal of the amplifier, as the subtaction signal;

a second limiter for making the level of the difference signal uniform, thus outputting a second level-uniform output signal; and a FM demodulator for demodulating the second level-uniform addition signal, thus outputting a demodulated reproduced luminance signal.

* * * * *